US008428992B2

(12) United States Patent
Cox et al.

(10) Patent No.: US 8,428,992 B2
(45) Date of Patent: Apr. 23, 2013

(54) ESTIMATING TRAINING DEVELOPMENT HOURS

(75) Inventors: Douglas W. Cox, Roanoke, IN (US); Philip J. Millis, Monument, CO (US)

(73) Assignee: Raytheon Company, Waltham, MA (US)

( * ) Notice: Subject to any disclaimer, the term of this patent is extended or adjusted under 35 U.S.C. 154(b) by 260 days.

(21) Appl. No.: 12/823,608

(22) Filed: Jun. 25, 2010

(65) Prior Publication Data

US 2010/0332274 A1 Dec. 30, 2010

Related U.S. Application Data

(60) Provisional application No. 61/221,274, filed on Jun. 29, 2009.

(51) Int. Cl.
*G06Q 10/00* (2006.01)

(52) U.S. Cl.
USPC ........ 705/7.13; 705/7.17; 705/7.23; 705/7.37

(58) Field of Classification Search ................. 705/7.13, 705/7.17, 7.23, 7.37
See application file for complete search history.

(56) References Cited

U.S. PATENT DOCUMENTS

2003/0009742 A1* 1/2003 Bass et al. ...................... 717/104
2004/0186757 A1* 9/2004 Starkey ............................. 705/7
2006/0041857 A1* 2/2006 Huang et al. .................. 717/104
2008/0313110 A1* 12/2008 Kreamer et al. ................ 706/12

OTHER PUBLICATIONS

"NPL-Army," TRADOC Pamphlet 350-70-2, "Multimedia Courseware Development Guide," Department of the Army, Headquarters, United States Army, Training and Doctrine Command, Fort Monroe, Virginia 23651-1047, Jun. 26, 2003, 238 pages.*
NPL-Army, TRADOC Pamphlet 350-70-2, "Multimedia Courseware Development Guide," Department of the Army, Headquarters, United States Army, Training and Doctrine Command, Fort Monroe, Virginia 23651-1047, Jun. 26, 2003, 238 pages.*
"COCOMO and SCORM: Cost Estimation Model for Web Based Training," Dec. 2006, Interservice/Industry Training, Simulation, and Education Conference, presentation retrieved from http://www.modelbenders.com/papers, the website of Roger D. Smith.*
Smith, "COCOMO-SCORM: Interactive Courseware Project Cost Modeling," Jul. 2006, International Council of Systems Engineering Conference, pp. 1-11.*
Jalote, "An Integrated Approach to Software Engineering," 2005, Springer Science, pp. 15, 33-34, 70-75, 189, 208-209, 212, 215-219, 240-242.*
Rao, "Computer Education," 2003, Published by APH Publishing Corp., pp. 233, 246.*

(Continued)

*Primary Examiner* — Andre Boyce
*Assistant Examiner* — Ivan R Goldberg
(74) *Attorney, Agent, or Firm* — Daly, Crowley, Mofford & Durkee, LLP

(57) ABSTRACT

In one aspect, a method to estimate training development hours includes receiving data on factors selected by a user using a user interface and using a computer processor to estimate training development hours based on the data on the factors. The method may further include determining the training development hours based on the data on the factors an assigned base development hours, estimated contact hours and an analysis percentage.

9 Claims, 3 Drawing Sheets

OTHER PUBLICATIONS

Garnsey, "COCOMO and SCORM: Cost Estimation Model for Web-based Training," 2006, Interservice/Industry Training, Simulation, and Education Conference, Paper No. 2474.*

Army Training Manual, TRADOC Pamphlet 350-70-2, "Multimedia Courseware Development Guide", Department of the Army, Headquarters, United States Army, Training and Doctrine Command, Fort Monroe, Virginia 23651-1047, Jun. 26, 2003, 238 pages.

* cited by examiner

ESTIMATING TRAINING DEVELOPMENT HOURS

RELATED APPLICATIONS

This application claims priority to provisional application Ser. No. 61/221,274, entitled "TRAINING DEVELOPMENT ESTIMATING," filed Jun. 29, 2009, which is incorporated herein in its entirety.

BACKGROUND

In 2006, the Department of Defense (DOD) mandated use of the Sharable Content Object Reference Model (SCORM), which provides a framework that enables standardized delivery of web-based training courses, but there are no established means for the training developers to create SCORM-compliant cost estimates. While software estimates are routinely developed using established tools such as Constructive Cost Model (COCOMO), COCOMO II, Revised Intermediate COCOMO (REVIC), or SEER for Software (SEER-SEM), the web-based training community continues to employ heuristic-based estimates that vary widely and invite customer scrutiny due to their apparent subjectivity.

SUMMARY

In one aspect, a method to estimate training development hours includes receiving data on twelve factors selected by a user using a user interface and using a computer processor to estimate training development hours based on the data on the twelve factors.

In another aspect, an article includes a non-transitory machine-readable medium that stores executable instructions to estimate training development hours. The instructions cause a machine to receive data on factors selected by a user using a user interface, store a first table comprising base development hours by interactivity level for different categories, assign base development hours for each interactivity level based on a category selected by the user using the first table to form assigned base development hours (ABDH), receive estimated contact hours (ECH) for each of the interactivity levels, receive a percentage of an analysis area (APER) and determine training development hours based on the ECH, the APER, the ABDH and the data on the factors.

In a further aspect, an apparatus to estimate training development hours includes circuitry to receive data on factors selected by a user using a user interface, store a first table comprising base development hours by interactivity level for different categories, assign base development hours for each interactivity level based on a category selected by the user using the first table to form assigned base development hours (ABDH), receive estimated contact hours (ECH) for each of the interactivity levels, receive a percentage of an analysis area (APER) and percentages of design, development, implementation and evaluation (DDIE) areas and determine training development hours based on the ECH, the APER, the ABDH and the data on the factors. The percentages of the analysis area and the DDIE areas total 100%.

DETAILED DESCRIPTION

The benefits of a Sharable Content Object Reference Model (SCORM)-compliant cost estimation tool include greater process rigor, higher transparency for customer review, and reduced project risk. An internet product search for SCORM-compliant web-based training cost estimation tools found that in 2006, PEO STRI (Program Executive Office—Simulation, TRaining and Instrumentation) sponsored a project to determine whether it was feasible to create a derivative of the Constructive Cost Model (COCOMO) that provided a cost estimating capability for SCORM-conformant courseware projects. The resulting prototype tool uses 20 of COCOMO's 30 variables and was demonstrated in September 2006. Validation testing revealed a Pred(30)=43% (i.e., 43% of the time, the tool could accurately predict true costs within +/−30%), which is far too low for confident use.

The training cost estimation tools and techniques described herein has its basis not in COCOMO (PRED(25)=50%), but in DoD's own training cost estimation process, with variables that incorporate new standards for web-based training, e.g., SCORM and the incorporation of Learning Management Systems. The training cost estimation tools and techniques described herein starts with the base costs suggested in United States Army Training and Doctrine Command (TRADOC) Pamphlet (Pam) 350-70-2 for various interactivity levels, and then modifies those costs (as allowed in the TRADOC Pamphlet) by 12 variables (called herein factors), all on a single graphical user interface (GUI) screen (versus 7 screens for Constructive SCORM Cost Model (COSCOMO). The result is a tool that is totally transparent and readily accepted by the DoD customer.

The training cost estimation tools and techniques described herein is unique because it is the only one of its kind that is based on TRADOC Pam 350-70-2 methodology with modifications to reflect emerging web-based training requirements. Previous efforts such as COSCOMO failed because its COCOMO basis was ill-suited to training cost estimation. By combining DoD-based costing guidelines with web-based training modifiers, the methodology described herein is at once familiar to the customer, current in its approach, and user-friendly in its presentation. The tool accommodates a full range of courseware development aids and produces reliable web-based training cost estimates in less than 15 minutes, for example.

Figure 1A:
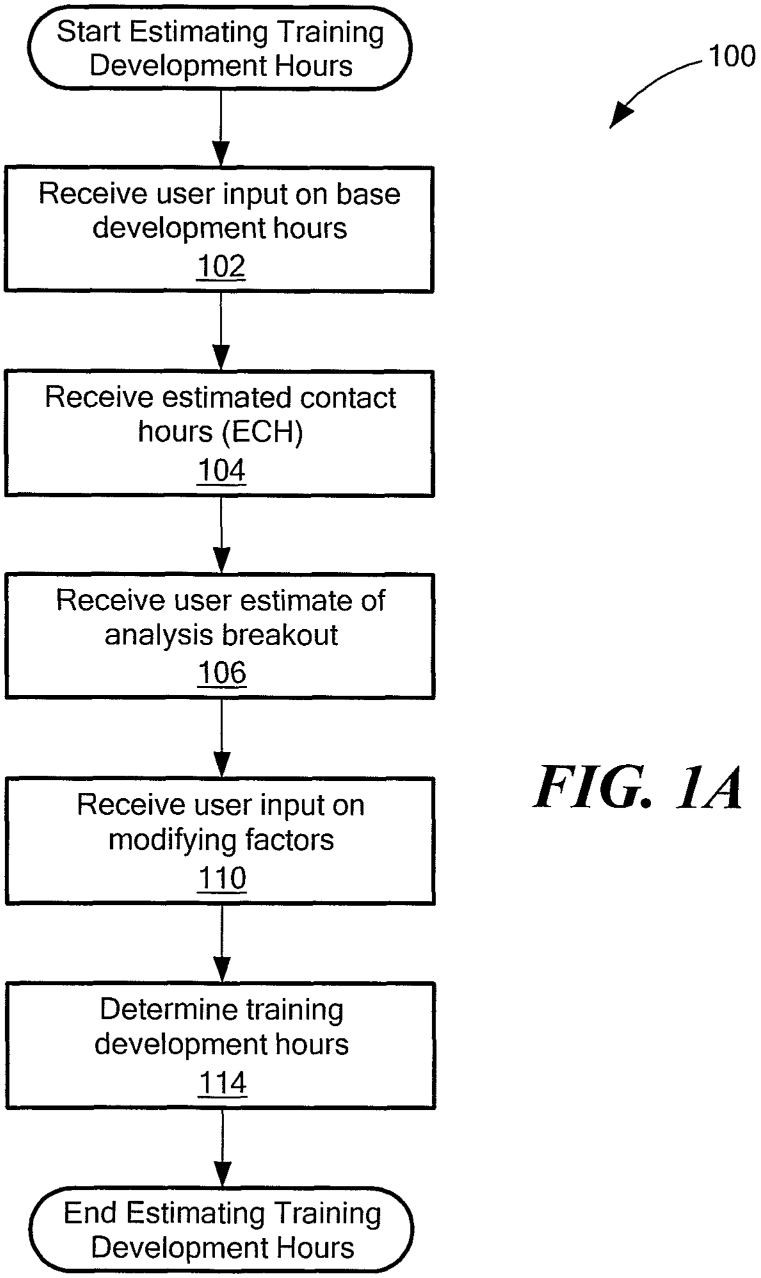
FIG. 1A is a flowchart of an example of a process used in estimating hours required for training development.
Figure 1B:
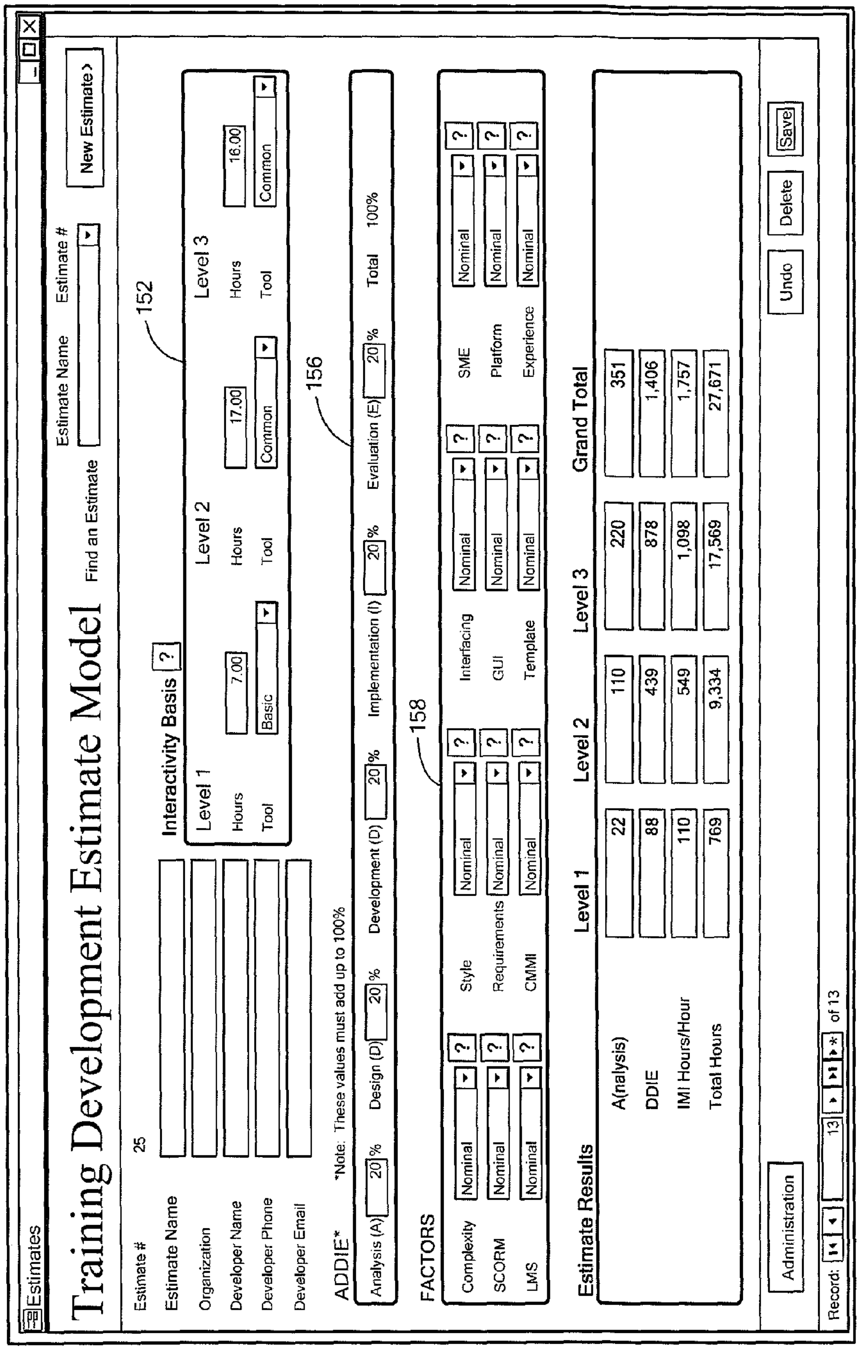
FIG. 1B is an example of a screenshot used in estimating hours required for training development.

Referring to FIGS. 1A and 1B, an example of a process to determine an estimate of hours required for training development is a process 100. User input is received on base development hours (102). The base development hours are the estimated costs to achieve any of three (3) customer-specified interactivity levels using a given development application. These costs are taken from a table (e.g., see Table I herein) containing base development time values in TRADOC Pam 350-70-2, and reflect government estimates for the Design, Development, Integration and Evaluation (DDIE) of computer-based training products. Interactivity Level 1 has the following characteristics: the objective is to familiarize the student, the structure is linear (page turner), there are no checks on learning and it employs simple graphics and/or audio. Interactivity level 2 has the following characteristics: the objective is to teach something new, the structure is linear with simple branching, checks on learning with remediation and employs standard graphics, audio and video. Interactivity Level 3 has the following characteristics: the objective is to apply new material to solving problems, the structure is only vaguely linear with exhaustive branching, problem solving with little remediation and employs complex graphics, audio and/or video.

For each of the three levels of interactivity defined in TRADOC Pam 350-70-02, the user provides further granularity by assigning one of three categories: Basic, Common and Specified to one or more of the three interactivity levels. The basic category represents that the tool is available to any training developer. The common category represents widely-used commercial courseware development tools. The specified category represents uniquely developed tool that may or may not exist in final form. In one particular example, in FIG. 1B, in a screenshot 120 of a user interface (UI) under the interactivity basis section 152, a user uses pull down menus to enter Basic for interactivity Level 1, Common for interactivity Level 2 and Common for interactivity Level 3.

Estimated contact hours are received (104). Estimated contact hours (ECH) are either specified by the customer or estimated by the training development team. ECH are the hours a student spends in training. For example, a user enters the estimated contact hours using a keyboard corresponding to each interactivity level. In one particular example, in FIG. 1B, under the interactivity basis section 152, 7.00 hours is entered for interactivity Level 1, 17.00 hours is entered for interactivity Level 2 and 16.00 hours is entered for interactivity Level 3.

The user provides estimates on the breakout between analysis with respect to design, development, implementation and evaluation (DDIE) for training (106). For example, a user provides a percentage for the analysis or analysis percentage (APER). The design represents the amount of time to design the training. The development is the amount of time developing the training. The implementation is the amount of time implementing the training. The evaluation is the amount of time evaluating the training. The analysis is the amount of time analyzing the training. In one example, the percentage for the analysis area and the total percentage for DDIE areas total 100%. In one particular example, in FIG. 1B, a user enters 20% using a keyboard for each of the areas under ADDIE section 156 so that APER is 20% and the combined percentage for the DDIE areas equals 80%.

The user provides input on modifying factors (110). In one example there are twelve modifying factors. The twelve modifying factors are: a subject matter complexity factor, a style guide maturity factor, an interface requirements factor, an availability of subject matter experts (SME) factor, a SCORM conformance factor, an engineering requirements maturity factor, a GUI stability factor, a training/objective platform stability factor, a learning management system (LMS) maturity factor, a developer Capability Maturity Model Integration (CMMI) level factor, a training design template availability factor and a team experience factor. In one example, for each of the modifying factors, the user selects, from a pull-down menu, a level for each factor. In one example, the levels are very low, low, nominal, high and very high.

The subject matter complexity factor represents a measure of the complexity of the subject matter to be trained. A very low level means that beginner material is used and/or no prior knowledge is needed, a low level means that subject matter is simple and straightforward. A nominal level means that there is well-documented, established material. A high level means that there is some documentation and/or variation on established material. A very high level means that sparse/no documentation is available and requires new/emerging material.

The style guide maturity factor represents to what degree a style guide is in its final form. A very low level means that the style guide is in early draft and subject to change. A low level means that the style guide is in final draft. A nominal level means that any changes to the style guide are expected to be minor. A high level means that the style guide is stable and well-established. A very high level means that there is no style guide and/or using best industry standards.

The interface requirements factor represents to what degree the training product should be coordinated with the training products of developers. A very low level means that the training cost estimate is a stand-alone training product. A low level means that coordination will be affected by a third party. A nominal level means that direct coordination is required with a single other developer. A high level means that direct coordination is required with multiple other developers. A very high level means that coordination is required with multiple developers through a third party.

The availability of subject matter experts (SME) factor represents to what degree are SMEs readily available and cognizant of the operational domain. A very low level means that no SMEs are available to development team. A low level means that SMES are available only through the customer. A nominal level means that SMEs are available but will need to learn new domain. A high level means that cognizant SMEs are available to team on shared basis. A very high level means that cognizant SMEs are already assigned to team.

The SCORM conformance factor represents to what degree must the deliverable be SCORM conformant. A very low level means that SCORM conformance is not required. A low level means that SCORM conformance is not required. A nominal level means that deliverable must broadly conform to SCORM standards. A high level means that deliverable must conform to SCORM standards in most areas. A very high level means that deliverable must rigorously adhere to SCORM.

The engineering requirements maturity factor represents to what degree are the engineering requirements stable and well understood. A very low level means that engineering requirements/budget are highly subject to change. A low level means that engineering anticipates moderate changes (15 to 25%). A nominal level means that engineering anticipates minimal change (5 to 10%). A high level means that the requirements are established and unlikely to change. A very high level means that the requirements are established and cannot be changed.

The GUI stability factor represents to what degree is the system GUI stable and well understood. A very low level means that a new system GUI will be created in parallel with the training. A low level means that a new system GUI is available in draft form. A nominal level means that an existing system GUI is being modestly tailored. A high level means that a system GUI is established and unlikely to change. A very high level means that a system GUI is well-established and cannot change.

The training/objective platform stability factor represents to what degree is the training/objective platform stable and well-defined. A very low level means that final platform is undetermined or exists only on paper. A low level means that a final platform is new, but is not available to training team. A nominal level means that a final platform is new but available to training team on a shared basis. A high level means that a final platform is new and available on a dedicated basis. A very high level means that a final platform is commonly available (e.g., a PC standard).

The learning management system (LMS) maturity factor represents the impact of the production effort if the deliverable product must interoperate with a LMS. A very low level means that LMS interoperability is not required. A low level means that the LMS is available or well-known to the training developer. A nominal level means that the LMS is new, but available for use during development. A high level means that a new LMS will be available prior to the end of training development. A very high level means that a new LMS is being generated in parallel with the training development.

The developer CMMI level factor represents what the CMMI rating is for the training development organization. A very low level means that the CMMI level is 1. A low level means that the CMMI level is 2. A nominal level means that the CMMI level is 3. A high level means that the CMMI level is 4. A very high level means that the CMMI level is 5.

The training design template availability factor represents to what degree the customer provided a stable training design template for the training developer's use. A very low level means that a template will be created in parallel with training. A low level means that a template is available in draft form. A nominal level means that an existing template is being modestly tailored. A high level means that a training template is established and unlikely to change. A very high level means that training template is well-established and cannot change.

The team experience factor represents to what degree has the intended training development team produced products similar to this one in the past. A very low level means that this is a new team, recently hired. A low level means that the team is mostly new, with a single experienced member. A nominal level means that the team is mostly experienced, but new to this kind of effort. A high level means that the team is experienced and has worked on similar efforts. A very high level means that the team has worked together for greater than a year on this type effort.

In one particular example, in FIG. 1B, a user under features section 158 uses pull-down menus to enter Nominal levels for each of the twelve modifying factors.

An estimate of the training development hours is determined (114). For example, the estimate of the training development hours is equal to the total hours for Interactivity Level 1+total hours for Interactivity Level 2+total hours for Interactivity Level 3. The total hours for each interactivity level is equal to:

$$[(ABDH)\cdot(MFV)+(\text{Analysis effort})]\cdot[ECH]$$

Or:

$$[(ABDH)\cdot(MFV)+(ABDH)\cdot(MFV)(APER)/(1-APER)]\cdot[ECH], \quad \text{Equation 1}$$

where ABDH is the assigned base development hours (ABDH) determined from Table I (below) based on categories (e.g., basic, common and specified) selected by the user (see processing block 102) and MFV is a modifying factors value (FV) determined using Table II (below) based on levels (e.g., very low, low, nominal, high and very high) selected by the user (see processing block 110), for example, by multiplying assigned numeric values for each of the twelve factors together.

In one example, as shown in FIG. 1B, the APER is equal to 0.2. The ECH is equal to 7.00 hrs for interactivity Level 1, 17.00 hrs for Interactivity Level 2 and 16.00 hrs for Interactivity Level 3 as shown in section 152.

The "base development hours" is determined based on the one of three categories (basic, common and specified) selected by the user for the three interactivity levels from TRADOC Pam 350-70-2 and a corresponding value is selected from Table I.

TABLE I

| BASE DEVELOPMENT HOURS | | | |
|---|---|---|---|
| | Basic | Common | Specified |
| Level 1 | 50 | 100 | 150 |
| Level 2 | 150 | 250 | 300 |
| Level 3 | 300 | 500 | 600 |

In one particular example, as shown in FIG. 1B, if Interactivity Level 1 is rated a basic category by the user then the corresponding hours, ABDH, is 50, if Interactivity Level 2 is rated a common category by the user then the corresponding hours, ABDH, is 250 and if Interactivity Level 3 is rated a common category by the user then the corresponding hours, ABDH, is 300.

The twelve modifying factors are multiplied together to form the MVF term. In particular, for each of the twelve factors, the level (e.g., very low, low, nominal, high and very high) selected by the user each modifying factor corresponds to a value (v) in Table II below and each of the values (v) for each term is multiplied together.

TABLE II

| | Modifying Factors Table | | | | |
|---|---|---|---|---|---|
| Factors | Very Low | Low | Nominal | High | Very High |
| Complexity | 0.8 | 0.9 | 1.0 | 1.3 | 1.5 |
| Style | 1.3 | 1.2 | 1.1 | 1.0 | 1.0 |
| Interface | 1.0 | 1.0 | 1.0 | 1.1 | 1.2 |
| SME | 1.5 | 1.3 | 1.0 | 0.9 | .8 |
| SCORM | 1.0 | 1.0 | 1.1 | 1.25 | 1.35 |
| Requirements | 1.5 | 1.3 | 1.2 | 1.0 | 1.0 |
| GUI | 1.35 | 1.25 | 1.0 | 1.0 | 1.0 |
| Platform | 1.2 | 1.1 | 1.0 | 1.0 | 1.0 |
| LMS | 0.9 | 1.0 | 1.1 | 1.2 | 1.3 |
| CMMI | 1.4 | 1.3 | 1.0 | 0.9 | 0.8 |
| Template | 1.3 | 1.2 | 1.1 | 1.0 | 1.0 |
| Experience | 1.3 | 1.2 | 1.0 | 0.8 | 0.7 |

For example, if each of the levels for the twelve modifying factors is nominal then the term MVF is equal to (1.0)·(1.1)·(1.0)·(1.0)·(1.1)·(1.2)·(1.0)·(1.0)·(1.1)·(1.0)·(1.1)·(1.0) or 1.76.

Thus, using the values APER, ECH, MVF in this example into Equation 1:

the total hours for Interactivity Level 1 is equal to:

$$[(50)\cdot(1.76)+(50)\cdot(1.76)(0.2/0.8)]\cdot[7.00] \text{ or } [110]\cdot[7.00] \text{ or 769 hours,}$$

the total hours for Interactivity Level 2 is equal to:

$$[(250)\cdot(1.76)+(250)\cdot(1.76)(0.2/0.8)]\cdot[17.00] \text{ or } [549]\cdot[17.00] \text{ or 9,334 hours,}$$

the total hours for Interactivity Level 3 is equal to:

$$[(500)\cdot(1.76)+(500)\cdot(1.76)(0.2/0.8)]\cdot[16.00] \text{ or } [1{,}098]\cdot[16.00] \text{ or 1,757 hours.}$$

Therefore, the combined total estimate of the training development hours is equal to 769+9,334+17,569 or 27,671 hours as shown in FIG. 1B.

Figure 2:
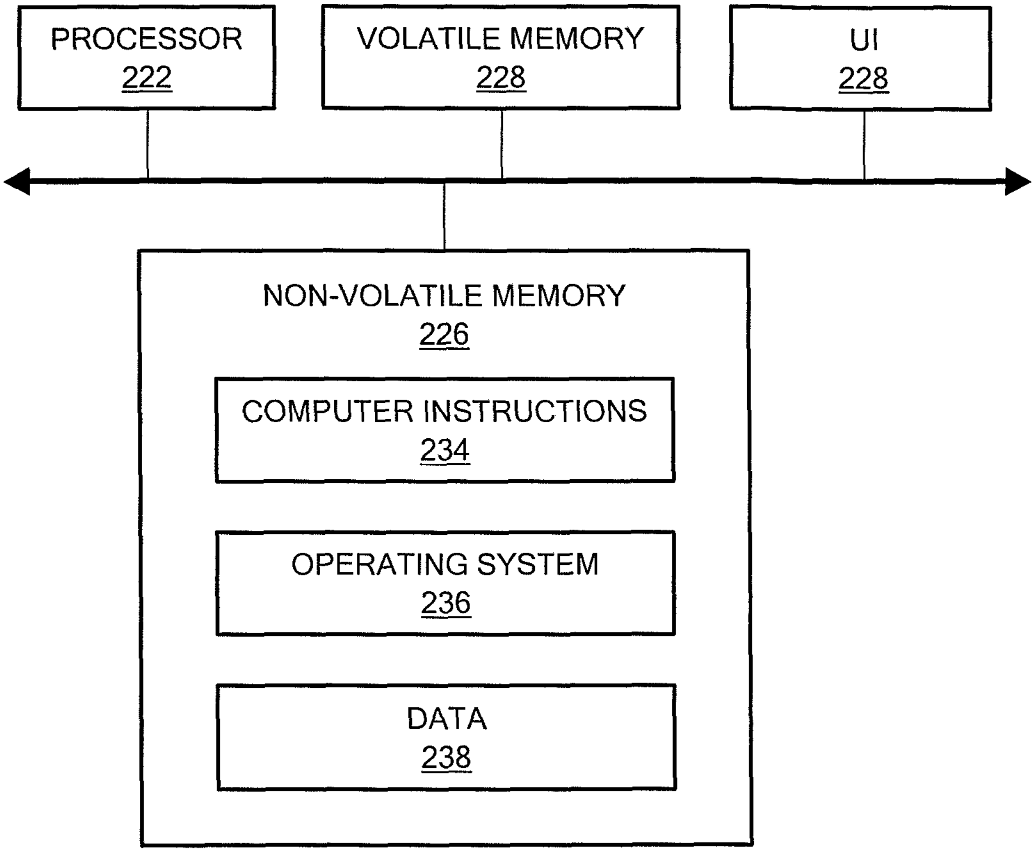
FIG. 2 is a block diagram of a computer on which the process of FIG. 1A may be implemented.

Referring to FIG. 2, a computer 200 includes a processor 222, a volatile memory 224, a non-volatile memory 226 (e.g., a hard disk) and a user interface (UI) 228 (e.g., shown in screenshot 120, a mouse, a keyboard, a touch screen and so forth or any combination thereof). The non-volatile memory 226 stores computer instructions 234, an operating system 236 and data 238 such as, for example, Tables I and II. In one example, the computer instructions 234 are executed by the processor 222 out of volatile memory 224 to perform at least some or part of process 100.

The processes described herein (e.g., the process 100) are not limited to use with the hardware and software of FIG. 2; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The system may be implemented, at least in part, via a computer program product, (e.g., in a machine-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 100. Process 100 may also be implemented as a machine-readable medium such as a machine-readable storage medium, configured with a computer program, where upon execution, instructions in the computer program cause the computer to operate in accordance with the processes (e.g., the process 100).

The processes described herein are not limited to the specific embodiments described herein. For example, the process 100 is not limited to the specific processing order of FIG. 1A, respectively. Rather, any of the processing blocks of FIG. 1A may be re-ordered, combined or removed, performed in parallel or in serial, as necessary, to achieve the results set forth above.

The processing blocks in FIG. 1A associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method to estimate training development hours, comprising:

storing a first table comprising base development hours by interactivity level for different categories;

receiving, from a user using a user interface, a category selected by the user for each interactivity level;

assigning base development hours for each interactivity level using the first table based on the category selected by the user to form assigned base development hours (ABDH);

receiving estimated contact hours (ECH) associated with the category selected, provided by the user using the user interface, for each interactivity level;

receiving a percentage of an analysis area (APER) indicating an amount of time analyzing training;

storing a modifying factors table comprising twelve factors and a numeric value for each of a plurality of levels of a factor;

receiving, from the user using the user interface, a selection of one of the plurality of levels for each factor of the twelve factors;

assigning a numeric value for each of the twelve factors based on the level selected by the user based on the modifying factors table;

multiplying the assigned numeric values for each of the twelve factors together to form a modifying factors value (MFV);

using a computer processor to estimate training development hours for each of the interactivity levels based on the ABDH, ECH, APER and the MFV comprising determining total hours for each of the interactivity levels based on the following relationship:

$$\text{Total Hours}=[(\text{ABDH})\cdot(\text{MFV})+(\text{ABDH})\cdot(\text{MFV})(\text{APER})/(1-\text{APER})][\text{ECH}].$$

2. The method of claim 1 wherein receiving data on the twelve factors comprises receiving data on twelve factors comprising:

a subject matter complexity factor;

a style guide maturity factor;

an interface requirements factor;

an availability of subject matter experts (SME) factor;

a Sharable Content Object Reference Model (SCORM) conformance factor;

an engineering requirements maturity factor;

a graphical user interface (GUI) stability factor;

a training/objective platform stability factor;

a learning management system (LMS) maturity factor;

a developer Capability Maturity Model Integration (CMMI) level factor;

a training design template availability factor; and a team experience factor.

3. An article, comprising:

a non-transitory machine-readable medium that stores executable instructions to estimate training development hours, the instructions causing a machine to:

store a first table comprising base development hours by interactivity level for different categories;

receive, from a user using a user interface, a category selected by the user for each interactivity level;

assign base development hours for each interactivity level using the first table based on a category selected by the user to form assigned base development hours (ABDH);

receive estimated contact hours (ECH) associated with the category selected, provided by the user using the user interface, for each of the interactivity levels;

receive a percentage of an analysis area (APER) indicating an amount of time analyzing training;

store a modifying factors table comprising factors and a numeric value for each of a plurality of levels of a factor;

receive, from the user using the user interface, a selection of one of the plurality of levels for each factor of the factors;

assign a numeric value for each of the factors based on the level selected by the user based on the modifying factors table;

multiply the assigned numeric values for each of the factors together to form a modifying factors value (MFV);

determine training development hours for each of the interactivity levels based on the ECH, the APER, the ABDH and the MFV comprising instructions causing the machine to determine total hours for each of the interactivity levels based on the following relationship:

$$\text{Total Hours}=[(\text{ABDH})\cdot(\text{MFV})+(\text{ABDH})\cdot(\text{MFV})(\text{APER})/(1-\text{APER})][\text{ECH}].$$

4. The article of claim 3 wherein the factors comprise twelve factors.

5. The article of claim 4 wherein the twelve factors comprise:

a subject matter complexity factor;

a style guide maturity factor;

an interface requirements factor;

an availability of subject matter experts (SME) factor;

a Sharable Content Object Reference Model (SCORM) conformance factor;

an engineering requirements maturity factor;

a graphical user interface (GUI) stability factor;

a training/objective platform stability factor;

a learning management system (LMS) maturity factor;

a developer Capability Maturity Model Integration (CMMI) level factor;

a training design template availability factor; and a team experience factor.

6. An apparatus to estimate training development hours, comprising:

circuitry to:

store a first table comprising base development hours by interactivity level for different categories;

receive, from a user using a user interface, a category selected by the user for each interactivity level;

assign base development hours for each interactivity level using the first table based on a category selected by the user to form assigned base development hours (ABDH);

receive estimated contact hours (ECH) associated with the category selected, provided by the user using the user interface, for each of the interactivity levels;

receive a percentage of an analysis area (APER) indicating an amount of time analyzing training and percentages of design, development, implementation and evaluation (DDIE) areas;

store a modifying factors table comprising factors and a numeric value for each of a plurality of levels of a factor;

receive, from the user using the user interface, a selection of one of the plurality of levels for each factor of the factors;

assign a numeric value for each of the factors based on the level selected by the user based on the modifying factors table;

multiply the assigned numeric values for each of the factors together to form a modifying factors value (MFV);

determine training development hours for each of the interactivity levels based on the ECH, the APER, the ABDH and the MFV comprising circuitry to determine total hours for each of the interactivity levels based on the following relationship:

$$\text{Total Hours}=[(\text{ABDH})\cdot(\text{MFV})+(\text{ABDH})\cdot(\text{MFV})(\text{APER})/(1-\text{APER})][\text{ECH}],$$

wherein the percentages of the analysis area and the DDIE areas total 100%.

7. The apparatus of claim 6 wherein the circuitry comprises at least one of a processor, programmable logic and logic gates.

8. The apparatus of claim 6 wherein the factors comprise twelve factors.

9. The apparatus of claim 8 wherein the twelve factors comprise:

a subject matter complexity factor;

a style guide maturity factor;

an interface requirements factor;

an availability of subject matter experts (SME) factor;

a Sharable Content Object Reference Model (SCORM) conformance factor;

an engineering requirements maturity factor;

a graphical user interface (GUI) stability factor;

a training/objective platform stability factor;

a learning management system (LMS) maturity factor;

a developer Capability Maturity Model Integration (CMMI) level factor;

a training design template availability factor; and a team experience factor.

* * * * *